April 18, 1950 F. B. POST 2,504,727
MIXER BOWL COVER
Filed Nov. 7, 1949
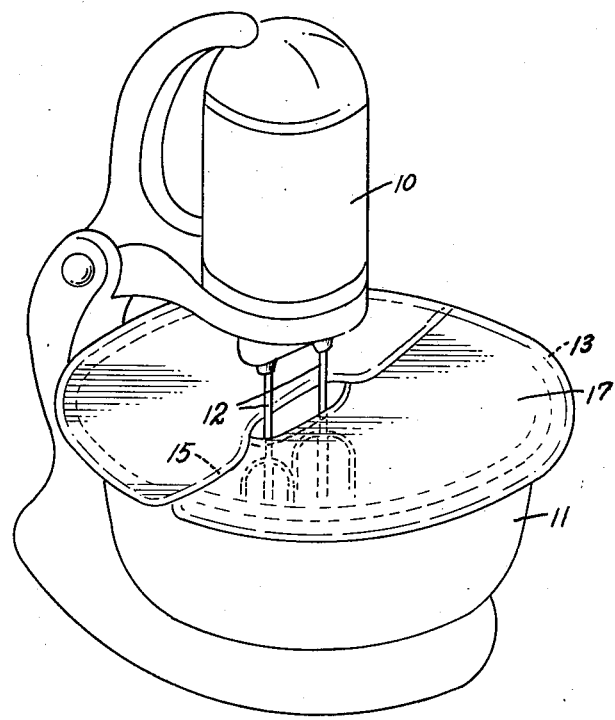
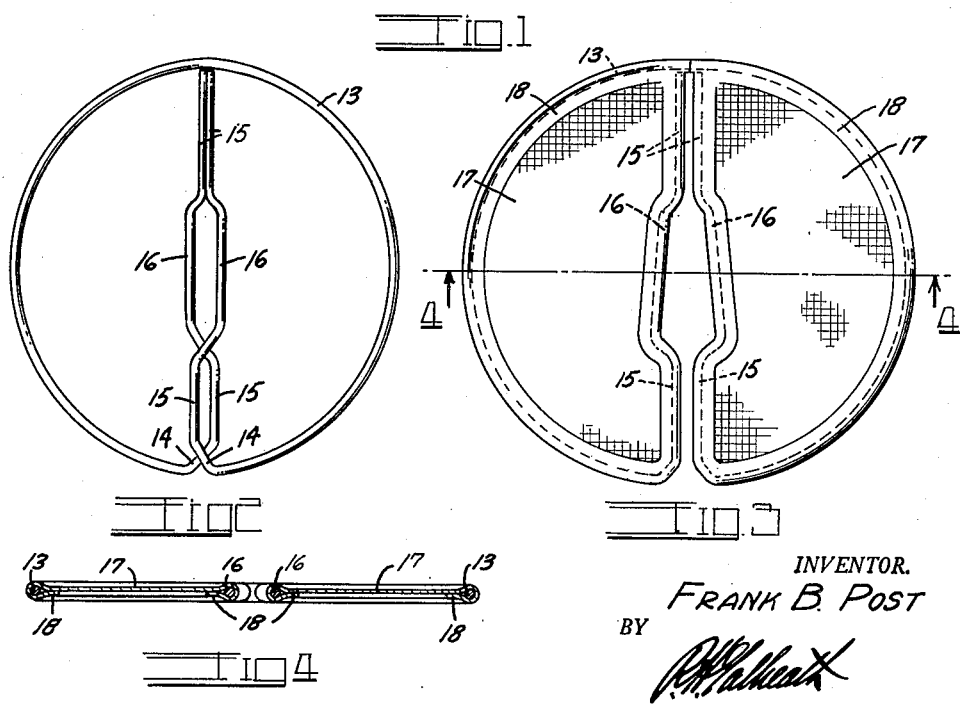
INVENTOR.
FRANK B. POST
BY
ATTORNEY Patented Apr. 18, 1950

2,504,727

UNITED STATES PATENT OFFICE 2,504,727

MIXER BOWL COVER

Frank B. Post, Denver, Colo.

Application November 7, 1949, Serial No. 125,929

3 Claims. (Cl. 259—125)

This invention relates to a cover for electric, household type, mixer bowls and has for its principal object the provision of a simple, highly efficient, light-weight, economical, easily used device which can be placed over any of the conventional mixer bowls after the bowl is in place on the mixer to prevent splashing; which can be quickly and easily washed and rinsed; which will be transparent so that the mixing operation can be observed through the bowl cover; and which will accommodate mixers of various types.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 illustrates the improved mixer bowl cover in place on a typical, conventional electric mixer;

Fig. 2 is a plan view of the frame of the improved cover in the released or closed position;

Fig. 3 is a similar view of the complete cover in the stressed or open position; and Fig. 4 is a cross section, taken on the line 4—4, Fig. 3.

In Fig. 1 a typical mixer is illustrated with its motor at 10, mixer bowl at 11 and mixing shafts at 12. The improved cover is designed to cover the bowl 11 and surround the shafts 12.

Briefly, the cover consists of a single length of spring wire such as spring brass, stainless steel or the like and with a flexible transparent plastic sheet secured around its edges to the wire so as to be supported thereby in a "drumhead" arrangement.

In the embodiment illustrated, the spring wire is bent intermediate its extremities to form a complete circular wire portion 13. The extremities of the circular portion 13 are then bent inwardly toward the axis to form angular portions 14 which extend into straight diametric portions 15 extending across the axis of the circular portion 13 and terminating adjacent the circumference of the circular portion 13.

The two straight diametric portions 15 are bent outwardly from each other at the axis of the circular portion 13 to form offset portions 16. This divides the circle outlined by the circular portion 13 into two semicircular halves. Each half is covered by means of a plastic sheet 17 of suitable, flexible, transparent, water-proof material, such as the plastic impregnated cloths at present on the market. The edges of the plastic sheet are folded over and under the outlining wire portions and are cemented, stitched or otherwise secured, as indicated at 18.

This provides a resilient, transparent "drumhead" or disc in which the two halves normally slightly overlap each other, as shown in Fig. 2. The two halves can be pulled apart by flexing the circular wire portion 13, as shown in Fig. 3. The separated halves can then be passed about the mixing shafts 12 and released to snap together about the shafts and over the bowl 11, as shown in Fig. 1.

It will be noted that the mix is prevented from splashing from the bowl and that the device can be instantly removed by simply withdrawing it from the shafts 12. The extremities of the offset portions 16 are inclined so they will automatically separate as they are withdrawn from the shafts 12. The inclined portions 14 also facilitate the placing of the cover in place, since they can be simply pushed against the mixer shafts and will act to automatically separate the two halves until the offset portions 16 are reached.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A cover for the mixer bowl of an electric mixer having vertically extending mixing shafts comprising: a single length of spring wire bent intermediate its extremities into a circular form, the extremities of said wire extending diametrically across said circular form to the opposite circumferences thereof to divide the circle outlined by said wire into two halves; and a sheet of flexible material secured at its edges and extending between said wire so as to form two semi-circular cover portions.

2. A cover for the mixer bowl of an electric mixer having vertically extending mixing shafts comprising: a single length of spring wire bent intermediate its extremities into a circular form, the extremities of said wire extending diametrically across said circular form to the opposite circumferences thereof to divide the circle outlined by said wire into two halves, the diametrically extending extremities of said wires being bent outwardly from each other adjacent the axis of said circular portion to provide an opening for the passage of the mixing shafts; and a circular sheet of flexible material secured around its edges to the circular portion of said wire, said sheet being split to follow the diametrically extending portions of said wire.

3. A cover for the mixer bowl of an electric mixer having vertically extending mixing shafts comprising: a single length of spring wire bent intermediate its extremities into a circular form, the extremities of said wire extending diametrically across said circular form to the opposite circumferences thereof to divide the circle outlined by said wire into two halves, the diametrically extending extremities of said wires being bent outwardly from each other adjacent the axis of said circular portion to provide an opening for the passage of the mixing shafts; and a circular sheet of flexible material secured around its edges to the circular portion of said wire, said sheet being split to follow the diametrically extending portions of said wire, said wire being inclined outwardly where the diametric portions join the circular portions to form an entering notch for said mixer shafts.

FRANK B. POST.

REFERENCES CITED

The following references are of record in the file of this patent:

UNITED STATES PATENTS

| Number | Name | Date |
|---|---|---|
| 2,051,883 | Morgan | Aug. 25, 1936 |